United States Patent [19]

Suminoe et al.

[11] Patent Number: 4,550,001

[45] Date of Patent: Oct. 29, 1985

[54] PROCESS FOR PRODUCING SHAPED ARTICLES HAVING IMPROVED SURFACES

[75] Inventors: Taro Suminoe, Tokyo; Tetsuo Ito, Machida; Yasuhiro Kiyomatsu, Yokohama; Takao Shimizu, Toda, all of Japan

[73] Assignees: Japan Synthetic Rubber Co., Ltd.; Ricky Contact Lens Research Institute Inc., both of Tokyo, Japan

[21] Appl. No.: 586,656

[22] Filed: Mar. 9, 1984

Related U.S. Application Data

[63] Continuation of Ser. No. 388,993, Jun. 16, 1982, abandoned.

[30] Foreign Application Priority Data

Jun. 22, 1981 [JP] Japan .................................. 56-96162
Oct. 9, 1981 [JP] Japan ................................ 56-160249
Dec. 29, 1981 [JP] Japan ................................ 56-213132

[51] Int. Cl.$^4$ ............................................. C08J 7/14
[52] U.S. Cl. ..................................... 264/2.6; 264/1.7; 264/232; 264/340; 264/343; 528/486; 528/487; 528/489; 528/499
[58] Field of Search .............. 528/486, 487, 489, 499; 264/1.7, 2.6, 232, 340, 343

[56] References Cited

U.S. PATENT DOCUMENTS

| | | | |
|---|---|---|---|
| 3,221,083 | 11/1965 | Crandon | 264/2.6 |
| 3,361,858 | 1/1968 | Wichterle | 264/343 |
| 3,496,254 | 2/1970 | Wichterle | 264/343 |
| 3,503,942 | 3/1970 | Seiderman | 351/160 R |
| 3,542,907 | 11/1970 | Wichterle | 264/343 |
| 3,700,761 | 10/1972 | O'Driscoll | 264/2.6 |
| 3,728,317 | 4/1973 | Blank | 264/2.6 |
| 3,802,912 | 4/1974 | Otocka | 264/340 |
| 3,850,892 | 11/1974 | Shen et al. | 526/320 |
| 3,880,818 | 4/1975 | Shen et al. | 351/160 R |
| 3,937,680 | 2/1976 | de Carle | 351/160 R |
| 4,143,017 | 3/1979 | Tarumi | 264/2.6 |
| 4,317,788 | 3/1982 | Imada | 264/232 |

FOREIGN PATENT DOCUMENTS 1469715 4/1977 United Kingdom .

*Primary Examiner*—Paul R. Michl
*Attorney, Agent, or Firm*—Oblon, Fisher, Spivak, McClelland & Maier

[57] ABSTRACT

A process for producing shaped articles having improved surfaces, characterized by subjecting a shaped article of a polymer derived from a monomeric material comprising an acrylate and/or methacrylate to at least one of a hot water treatment, an aqueous alkali solution treatment and an aqueous acid solution treatment. Shaped articles obtained by this process have an advantage that when the surfaces thereof are stained the removal of the stains is quite easy. Moreover, they are hydrophilic and have excellent wettability by water. Therefore, said shaped articles are extremely suitable for use as contact lens.

14 Claims, No Drawings

PROCESS FOR PRODUCING SHAPED ARTICLES HAVING IMPROVED SURFACES

This application is a continuation of application Ser. No. 388,993 filed June 16, 1982 abandoned.

This invention relates to a process for producing shaped articles having improved surfaces and, more particularly, to a process for producing shaped articles having improved surfaces which is suitable to obtain superior contact lenses.

The following types of contact lenses have hitherto been known:
Non-hydrous contact lenses
  Hard contact lenses consisting of a polymethyl methacrylate.
  Soft contact lenses consisting of a polysiloxane.
Hydrous contact lenses
  Soft contact lenses of hydrogel type consisting of a poly-2-hydroxyethyl methacrylate or a polyvinyl pyrrolidone.

All these lenses have problems. In the case of hard contact lenses consisting of a polymethyl methacrylate, stains formed on lens surfaces such as sebum palpebrale, finger sebum, cosmetic and the like are difficult to remove, and the use of a special cleaning solution is required for the removal. Furthermore, the hydrophilicity, namely the wettability, of lens surfaces is poor, and therefore, the movability of lenses on eyeball is inferior when the lenses are applied, and such materials as sebum palpebrale and the like adhere to lens surfaces causing reduced visibility. In the case of soft contact lenses consisting of a polysiloxane, similarly to the case of hard contact lenses consisting of a polymethyl methacrylate, surface stains are difficult to remove and the hydrophilicity of lens surfaces is poor. It is a hydrogel type soft contact lens which was developed as a contact lens of good hydrophilicity. Because these lenses are highly hydrous, the forms and dimensions of the lenses are liable to change and also the interiors of the lenses are susceptible to contamination by bacteria. This necessitates sterilization of lenses with boiling water or a chemical solution, resulting in an acceleration of the deterioration of lens materials.

As a result of extensive studies to solve the above problems, the present inventors have found a method of solving the above problems by subjecting a shaped article consisting of a polymer of an acrylate and/or a methacrylate to a special surface treatment.

According to the present invention, there is provided a process for producing a shaped article having an improved surface, characterized by subjecting a shaped article consisting of a polymer obtained from monomeric material comprising at least one member selected from acrylates and methacrylates to at least one of a hot water treatment, an aqueous alkali solution treatment and an aqueous acid solution treatment.

Shaped articles having improved surfaces produced according to this invention are characterized in that stains formed on lens surfaces are removed quite easily and these articles are hydrophilic and excellent in wettability. In addition, because only the surfaces are improved and the shaped articles per se are substantially non-hydrous, the forms and dimensions of high precision can be retained.

Contact lenses obtained according to this invention are very easy to handle, unlike conventional contact lenses consisting of polymethyl methacrylate or polysiloxane, becaue stains formed on lens surfaces such as finger sebum and cosmetic can be removed by only washing it with water without using a special cleaning solution. In addition, the contact lenses according to the present invention are hydrophilic, excellent in wettability, easy to move on eyeballs when applied, do not pick up sebum palpebrale on lens surfaces, and can, therefore, retain their original visibility. Furthermore, because these contact lenses are substantially non-hydrous, the forms and dimensions of contact lenses do not change and the interiors of contact lenses are not contaminated with bacteria.

As the acrylate and the methacrylate which are the monomers for the polymer used in the present invention, there may be mentioned acrylates, for example, methyl acrylate, ethyl acrylate, n-propyl acrylate, i-propyl acrylate, n-butyl acrylate, i-butyl acrylate, t-butyl acrylate, 2-ethylhexyl acrylate, n-octyl acrylate, and like and methacrylate, for example, ethyl methacrylate, n-propyl methacrylate, i-propyl methacrylate, n-butyl methacrylate, i-butyl methacrylate, t-butyl methacrylate, 2-ethylhexyl methacrylate, n-hexyl methacrylate, n-octyl methacrylate and the like. These compounds may be used alone or in combination of two or more. These acrylates and/or methacrylates are polymerized or copolymerized in a quantity of preferably more than 50 mole %, more preferably at least 60 mole % and most preferably at least 80 mole %.

In order to increase the mechanical strengths of the shaped articles and also to retain the original forms and dimensions of the shaped articles more precisely, it is preferable to copolymerize a polyfunctional monomer with the above monomers so that crosslinked structures are formed in the polymer. As the polyfunctional monomer used for the crosslinking purpose, there may be mentioned glycol diacrylates of olefins or polyolefins such as ethylene glycol diacrylate, diethylene glycol diacrylate, triethylene glycol diacrylate and the like; glycol dimethacrylates of olefins or polyolefins such as ethylene glycol dimethacrylates, diethylene glycol dimethacrylate, triethylene glycol dimethacrylate and the like; and polyfunctional acrylates or methacrylates such as trimethylolpropane trimethacrylate, allyl acrylate, vinyl-substituted benzylacrylates and the like. These polyfunctional monomers are copolymerized in a quantity of preferably 0.1 to 50 mole %, more preferably 0.5 to 10 mole %. When it is used in a quantity of less than 0.1 mole %, the mechanical strengths of shaped articles obtained are not increased sufficiently and their forms and dimensions are not sufficiently stabilized. When it is used in a quantity of more than 50 mole %, a longer time is required for the treatment of shaped articles mentioned hereinafter, and the improvement of the surfaces is not satisfactory.

As methods for shaping the polymer of a monomeric material comprising an acrylate and/or a methacrylate into a shaped article having the desired form according to the present invention, there may be mentioned, for example, a method in which the above-mentioned monomeric material is polymerized in a mold to obtain a polymer block and this polymer is cut into a desired form such as a contact lens form, and a method in which the above monomeric material is polymerized in a mold having a desired form such as a contact lens form. The polymerization of the above monomeric material can be conducted by the use of a polymerization initiator such as a peroxide (benzoyl peroxide, lauroyl peroxide, or the like), an azo compound (azobisisobutyronitrile, or the like) or a carbonium compound (diacetyl, benzoin, dibenzoin ether, or the like) and further by the use of heat or irradiation of a light such as ultraviolet light or electron rays. The temperature of polymerization is not critical as long as the monomeric material to be polymerized can be maintained in a liquid state at said temperature. However, it is preferable to conduct the polymerization at a temperature close to room temperature to reduce the strain of the shaped article obtained to a level as low as possible.

When the polymer is a soft polymer having a low glass transition temperature, and hence, the production of a shaped article from said polymer by cutting or the like is difficult, there may, of course, be used a method which comprises copolymerizing a polyfunctional monomer as an essential component with a monomer appropriately selected from the above-mentioned acrylate and methacrylate monomers and, if necessary, acrylic acid or methacrylic acid to obtain a hard polymer having a crosslinked structure and a high glass transition temperature, subsequently cutting this hard polymer into a shaped article having a desired form such as contact lens form, and then ester-interchanging or esterifying the ester or carboxyl group of the polymer with an alcohol, to produce a shaped article of a soft polymer having a low glass transition temperature. This method is the technology disclosed in U.S. Pat. No. 3,850,892. With this method, shaped articles of a soft polymer having a precise form and dimensions can be produced easily. In the present invention, a shaped article of a soft polymer having an improved surface can also be produced from the shaped article obtained by this method.

An explanation is made below of a method of improving the surfaces of a shaped article having the desired form and dimensions obtained as mentioned above. The surface-improving method includes a hot water treatment, a treatment with an aqueous alkali solution, a treatment with an aqueous acid solution and their combinations.

Firstly, the hot water treatment is explained. The hot water treatment may be conducted by dipping a shaped article in hot water under pressure, at atmospheric pressure or under reduced pressure, though it is usually conducted at a pressure of 0.1 to 5 atm. (absolute). The temperature of the hot water may be properly varied depending upon the treatment pressure, though a temperature between 50° C. and 150° C. is usually used. The treatment time is shorter when the treatment temperature is higher, but is generally 5 min to 48 hrs.

When the hot water treatment of a shaped article is conducted at atmospheric pressure, the treatment temperature is preferably 70° C. to a boiling point, particularly 90° C. to a boiling point, and the treatment time is preferably 1 to 48 hrs. When the treatment temperature is low, a long time is required for the surface improvement of the shaped article. Also, when the treatment time is less than 1 hr, the uniform improvement of the surface of the shaped article is difficult, and when the time exceeds 48 hrs the article surface is roughened.

When the hot water treatment is conducted under an applied pressure below 5 atm. (absolute), the treatment temperature is preferably 100° C. to a boiling point and the treatment time is usually 5 min to 8 hrs. In this case, it is possible to make the treatment time relatively short because of the high treatment temperature. When the hot water treatment is conducted under reduced pressure such as, for example, at a pressure between 0.1 atm. (absolute) and less than 1 atm. (absolute), the treatment temperature is preferably 50° C. to a boiling point and the treatment time is usually 3 to 48 hrs. In this case, a relatively long treatment time is required because of the low treatment temperature. However, as an advantage, the thermal deformation of the shaped article can be avoided.

As another hot water treatment method, steam may be sprayed on the surface of a shaped article. For instance, the hot water treatment can be conducted by spraying steam for a predetermined time on a shaped article placed in a metal cage. Naturally, the degree of improvement of the article surface may be varied depending upon the time of steam treatment, though the treatment time is usually 5 min to 8 hrs.

As the hot water, an aqueous inorganic salt solution and/or an aqueous organic salt solution may also be used to shorten the treatment time. For example, the treatment time can be reduced to 10 to 70%. With this treatment, even in the case of a thick shaped article, for example, an article having a thickness of more than 0.3 mm, the surface of the polymer can be improved without reducing its light transmittance.

As the inorganic salt used in the hot water treatment, there may be mentioned compounds such as sulfites, sulfates, nitrites, nitrates, phosphates and halides of metals of Groups Ia, Ib, IIa, IIb, IIIa, IVa, VIb, VIIb, and VIII of the Periodic Table.

Specific examples of these compounds include sodium sulfite, potassium sulfite, sodium sulfate, potassium sulfate, sodium hydrogensulfate (monohydrate), zinc sulfate (hexahydrate), copper sulfate (pentahydrate), aluminum sulfate, chromous sulfate (heptahydrate), stannous sulfate (dihydrate), manganese sulfate, ferrous sulfate (heptahydrate), nickel sulfate (hexahydrate), sodium nitrite, potassium nitrite, barium nitrite, sodium nitrate, potassium nitrate, calcium nitrate (tetrahydrate), barium nitrate, cobalt nitrate (hexahydrate), nickel nitrate (hexahydrate), sodium phosphate (dodecahydrate), potassium phosphate, lithium chloride, sodium chloride, potassium chloride, beryllium chloride (tetrahydrate), calcium chloride (hexahydrate), magnesium chloride (hexahydrate), barium chloride (dihydrate), cuprous chloride (dihydrate), aluminum chloride (hexahydrate), lead dichloride (dihydrate), manganese chloride (tetrahydrate), ferrous chloride (tetrahydrate), ferric chloride (hexahydrate), cobalt chloride, nickel chloride (hexahydrate), lithium bromide, and the like.

As the organic salt used in the hot water treatment, there may be mentioned compounds such as formates, acetates and citrates of metals of groups Ia and IIa of the Periodic Table. Specific examples of these compounds include sodium formate, potassium formate, calcium formate, sodium acetate (trihydrate), potassium acetate, calcium acetate (monohydrate), zinc acetate (dihydrate), lead acetate (trihydrate), nickel acetate, sodium citrate (dihydrate), potassium citrate (monohydrate), calcium citrate (tetrahydrate), and the like.

The above compounds are all soluble in water and do not decompose even in hot water. They are used in the form of an aqueous solution.

The concentration of these inorganic and/or organic salts in their aqueous solutions are not particularly restricted but are generally below their saturation points, preferably in the range from 2% by weight to saturation points. Addition of these compounds above saturation points does not increase its effect.

Further, the treatment with an aqueous alkali solution or an aqueous acid solution for a shaped article having the desired form is explained below.

When an aqueous alkali solution is used, the alkali may be, for instance, sodium hydroxide, potassium hydroxide or the like. The conditions for the treatment with the aqueous alkali solution are not critical, though it is preferable that the concentration of the aqueous alkali solution is 5 to 50% by weight and the treatment temperature is 30° to 120° C. In this case, the treatment time is usually 0.5 to 48 hrs. When the concentration of the aqueous alkali solution is less than 5% by weight or the treatment temperature is less than 30° C., too much time is required for the improvement of the article surface. On the other hand, when the concentration of the alkali solution is more than 50% by weight or the treatment temperature exceeds 120° C., the formation of uniformly improved surface is difficult, and therefore, a shaped article having an improved surface and a uniform quality is difficult to produce.

When an aqueous acid solution is used, the acid may be, for instance, hydrochloric acid, sulfuric acid, acetic acid or the like. The conditions for the treatment with the acid solution is also not critical, though it is preferable that the concentration of the aqueous acid solution is 5 to 90% by weight and the treatment temperature is 60° to 100° C. In this case, the treatment time is usually 3 to 48 hrs. When the concentration of the acid solution is less than 5% by weight or the treatment temperature is less than 60° C., too much time is required for the improvement of the article surface. On the other hand, when the concentration of the acid solution exceeds 90% by weight or the treatment temperature is more than 100° C., the polymer is, in some case, deteriorated, and as a result, the production of a shaped article having an improved surface and a uniform quality becomes difficult. As mentioned above, the conditions for the treatment with an aqueous alkali solution are milder than those for the treatment with an aqueous acid solution, and accordingly the article surface can be improved more easily by the treatment with the alkali solution.

A further surface improvement of a shaped article can be obtained by the above treatment with an aqueous alkali solution followed by a treatment with an aqueous acid solution. The conditions for the treatment with the acid solution in this case may be made milder than the case where the treatment is effected only with an aqueous acid solution without being subjected to the aqueous alkali solution treatment, and the conditions are usually as follows: The concentration of the aqueous acid solution is 1 to 30% by weight, the treatment temperature is 20° to 100° C., and the treatment time is 5 sec to 24 hrs.

The degree of surface improvement of a shaped article due to the treatment with an aqueous alkali solution and/or the treatment with an aqueous acid solution can be easily adjusted by changing the conditions for the treatment with the alkali solution and/or the treatment with the acid solution. The improved surface of the shaped article has a general thickness of 0.01 to 50 $\mu$m, and the thickness is preferably 0.01 to 20 $\mu$m. If the improved surface is thinner than 0.01 $\mu$m, the stain-removability and the hydrophilicity are both poor, and if the surface is thicker than 50 $\mu$m, the shaped article used as a contact lens comes to possess properties as hydrogel and there arises the possibility of contamination of the contact lens with bacteria.

The improved surface of a shaped article formed by the treatment with an aqueous alkali solution and/or the treatment with an aqueous acid solution can be further improved by treating it with a polyhydric alcohol in the presence of an acid catalyst. It is preferable that this treatment with a polyhydric alcohol is conducted after the surface of a shaped article subjected to the treatment with an aqueous alkali solution and/or the treatment with an aqueous acid solution has been washed with water and dried. As the acid catalyst in the treatment with a polyhydric alcohol, there may be used, for example, concentrated sulfuric acid, methanesulfonic acid and the like. As the polyhydric alcohol, there may be used, for example, ethylene glycol, glycerol, polyethylene glycol and the like. The quantity of the catalyst used is usually 0.1 to 5 parts by weight per 100 parts by weight of the polyhydric alcohol. The conditions for the treatment with the polyhydric alcohol are usually such that the temperature is 70° to 200° C. and the time is 1 to 24 hrs. By this polyhydric alcohol treatment, the improvement effect for the surface of the shaped article is further stabilized.

After the treatment with an aqueous alkali solution, an aqueous acid solution or a polyhydric alcohol, it is necessary that the shaped article be washed with water thoroughly.

The shaped article subjected to the treatment with an aqueous alkali solution, an aqueous acid solution or a polyhydric alcohol has particularly an improved oxygen permeability, and the shaped article is particularly excellent as a contact lens.

According to this invention, there can be easily produced a shaped article having an improved surface comprising a polymer derived from a monomeric material comprising an acrylate and/or a methacrylate, and the surface improvement is not due to coating of another material on the shaped article. Therefore, the shaped article having a surface improvement according to the present invention has no such problem that the improvement effect is reduced by peeling off the coating material.

In the particular case that the shaped article obtained in accordance with this invention is a contact lens, this contact lens is very easy to handle unlike the conventional contact lens consisting of polymethyl methacrylate or polysiloxane, because stains adhered to the lens surface such as finger sebum and cosmetic can be removed only by washing it with water without the necessity of using a special cleaning solution. Moreover, this contact lens is hydrophilic, excellent in wettability, and easy to move on eyeballs when actually used, and sebum palpebrale does not attach to the contact lens and, therefore, the contact lens can keep its good visibility. Furthermore, because the improved surface of the contact lens obtained according to this invention is not a laminated or coated layer but is substantially integral with the polymer of lens interior, there is no decrease in the effect of the improved layer or no peeling-off of the improved surface due to the use of the contact lens over a long period of time. In addition, because this contact lens is substantially non-hydrous, there is no change in the form and dimensions of lens due to the variation of water content of the lens or no contamination of lens interior with bacteria.

Referring to Examples and Comparative Examples, this invention will be explained below in more detail. In the Examples and the Comparative Examples, % is by weight unless otherwise specified.

EXAMPLE 1

Into a polyethylene mold having a diameter of 15 mm and a height of 20 mm was poured 1.5 ml of a mixture consisting of 300 ml of acrylic acid, 280 ml of n-butyl methacrylate, 30 ml of ethylene glycol methacrylate and 6 mg of benzoin. The mixture was subjected to polymerization at room temperature in a nitrogen atmosphere by irradiation with ultraviolet light. The polymer block obtained was shaped into a contact lens by an ordinary cutting. Then, this shaped article was dipped into n-propyl alcohol, and after addition of 1% of methanesulfonic acid, was subjected to reaction for 24 hrs at a refluxing temperature to esterify 93% of the carboxyl group in the polymer. After the reaction, the article was washed with n-propyl alcohol and dried to obtain a soft shaped article having a contact lens form (maximum thickness: 0.2 mm) consisting of a copolymer derived from n-propyl acrylate, n-butyl methacrylate, acrylic acid and ethylene glycol dimethacrylate. This soft shaped article was placed in a stainless steel container containing water and subjected to boiling treatment for 5 hrs at atmospheric pressure. Then, the article was dried to obtain a contact lens. Evaluation results of the lens are shown in Table 1.

EXAMPLE 2

A shaped article having a contact lens form (maximum thickness: 0.2 mm) which was obtained by the same procedure as in Example 1, was placed in an autoclave containing water, and treated for 2 hrs at 2 atm. (absolute) at 121° C. Then, the article was dried to obtain a contact lens. Its evaluation results are shown in Table 1.

EXAMPLE 3

A shaped article having a contact lens form (maximum thickness: 0.2 mm) which was obtained by the same procedure as in Example 1, was placed together with boiling stones in a glass container containing water, and subjected to boiling treatment (at about 91° C.) for 8 hrs at a reduced pressure of 0.7 atm. (absolute). Subsequently, the article was dried to obtain a contact lens. Its evaluation results are shown in Table 1.

Comparative Example 1

A shaped article having a contact lens form which was obtained by the same procedure as in Example 1, was dipped in water for 48 hrs at room temperature, dried and evaluated. Evaluation results are shown in Table 1.

TABLE 1

| Evaluation item | Example 1 | Example 2 | Example 3 | Comparative Example 1 |
|---|---|---|---|---|
| (a) Removability of stain | Good | Good | Good | Good |
| (b) Wettability | Good | Good | Good | Bad |
| (c) Contact angle of water | 80° | 82° | 83° | 93° |
| (d) Visibility range when applied | Good | Good | Good | Bad |
| (e) Movability on eyeball when applied | Good | Good | Good | Bad |
| (f) Durability of lens surface | Good | Good | Good | — |
| (g) Light transmittance | Above 92% | Above 92% | Above 92% | Above 92% |
| (h) Abnormality when used for a long time | | | | |
| Contact lens | Good | Good | Good | Bad |
| Cornea | Good | Good | Good | Bad |

Note:
(a) Removability of stain was examined by dipping a dry contact lens in water for 5 seconds, then coating a cold cream on the lens, washing the lens with water while keeping the lens between thumb and forefinger, and taking out the lens into the air to observe the condition of water droplet adhesion on the lens. The condition of no oily matter and good wetting with water is indicated as "Good", and the condition in which oily matters remained and water was repelled is indicated as "Bad".
(b) Wettability with water was examined by dipping a dry contact lens in water for 5 seconds, taking out the lens into the air and observing the condition of water droplet adhesion on the lens. The condition in which the entire surface of the lens was well wetted with water is indicated as "Good", and the condition in which water was repelled is indicated by "Bad".
(c) Contact angle of water was obtained by using a sliced disc of a diameter of 13 mm and a thickness of 0.2 mm cut differently from the case of contact lens and treated in the same manner as in the case of contact lens and by measuring with Contact Angle Tester Model CA-A (manufactured by Kyowa Kagaku) in accordance with the water droplet method.
(d) Visibility range when applied was evaluated by the visibility when a contact lens was actually applied. "Good" refers to a lens of good visibility, and "Bad" to a lens which gives cloudiness with blinks.
(e) Movability on eyeball when applied was evaluated by examining whether or not a contact lens on eyeball was moved with blinks. "Good" refers to a lens of moderate movability, and "Bad" to a lens of bad movability.
(f) Durability of lens surface was evaluated by holding a contact lens between thumb and forefinger, rubbing the lens with these fingers 2000 times in water, withdrawing it into the air and examining the condition of water droplet adhesion on the lens. A lens, the entire surface of which was well wetted with water is indicated as "Good", and a lens, the surface of which repelled water is indicated as "Bad".
(g) Light transmittance was obtained by using a sliced disc of a diameter of 13 mm and a thickness of 0.2 mm cut differently from the case of contact lens and treated in the same manner as in the case of contact lens and by measuring the transmittance of a visible light having a wavelength of 800 to 380 nm through the disc with Double Beam Spectrophotometer Model 200-20 (manufactured by Hitachi).
(h) Abnormality when used for a long time was evaluated by using a contact lens for 8 hours per day for one month and examining the conditions of the contact lens and cornea. As for the contact lens, stain due to sebum palpebrale and the like as well as transparency were examined. A contact lens having no stain due to sebum palpebrale and the like and keeping its original transparency is indicated as "Good". A contact lens having sebum palpebrale and a reduced transparency is indicated as "Bad". As to the cornea, ocular abnormality was examined. A lens which did not give abnormality to the cornea is indicated as "Good". A lens which gave corneal abrasion is indicated as "Bad".

EXAMPLE 4

A shaped article having a contact lens form (maximum thickness: 0.6 mm) obtained in the same manner as in Example 1 was placed in a stainless steel container containing 5% aqueous sodium chloride solution, and subjected to boiling treatment for 1 hr at atmospheric pressure. Then, the article was washed with water to obtain a contact lens. Evaluation results of this contact lens are shown in Table 2.

EXAMPLE 5

A shaped article having a contact lens form (maximum thickness: 0.2 mm) obtained in the same manner as in Example 1 was placed in a stainless steel container containing 10% aqueous sodium chloride solution, and subjected to boiling treatment for 3 hours at a reduced pressure of 0.7 atm. (absolute). Then, the article was washed with water to obtain a contact lens. Evaluation results of this contact lens are shown in Table 2.

EXAMPLE 6

A shaped article having a contact lens form (maximum thickness: 0.2 mm) obtained in the same manner as in Example 1 was placed in a stainless steel container containing 5% aqueous sodium acetate solution, and subjected to boiling treatment for 1 hr at atmospheric pressure. Then, the article was washed with water to obtain a contact lens. Evaluation results of this contact lens are shown in Table 2.

EXAMPLE 7

A mixture consisting of 300 ml of acrylic acid, 280 ml of n-butyl acrylate, 20 ml of diethylene glycol dimethacrylate, and 6 mg of benzoin was subjected to polymerization under the same conditions as in Example 1. Then, the polymer obtained was shaped into a contact lens by an ordinary cutting. This shaped article was dipped in n-butyl alcohol, and subjected to reaction in the same manner as in Example 1 to esterify 90% of the carboxyl group in the polymer. After the reaction, the article was washed with n-butyl alcohol and dried to obtain a soft shaped article having a contact lens form (maximum thickness: 0.4 mm) comprising a copolymer of n-butyl acrylate, acrylic acid and diethylene glycol dimethacrylate. This soft shaped article was placed in a stainless steel container containing 3% aqueous sodium chloride solution and heated for 5 hrs at 90° C. at atmospheric pressure. Subsequently, the article was washed with water to obtain a contact lens. Its evaluation results are shown in Table 2.

TABLE 2

| Evaluation item | Example 4 | Example 5 | Example 6 | Example 7 |
| --- | --- | --- | --- | --- |
| (a) Removability of stain | Good | Good | Good | Good |
| (b) Wettability | Good | Good | Good | Good |
| (c) Contact angle of water | 76° | 80° | 78° | 77° |
| (d) Visibility range when applied | Good | Good | Good | Good |
| (e) Movability on eyeball when applied | Good | Good | Good | Good |
| (f) Durability of lens surface | Good | Good | Good | Good |
| (g) Light transmittance | Above 92% | Above 92% | Above 92% | Above 92% |
| (h) Abnormality when used for a long time | | | | |
| Contact lens | Good | Good | Good | Good |
| Cornea | Good | Good | Good | Good |

Note:
Items (a) to (h) were evaluated in the same manners as in Table 1, respectively.

EXAMPLE 8

Into a polyethylene mold of a diameter of 15 mm and a height of 20 mm was poured 1.5 ml of a mixture consisting of 100 ml of n-butyl acrylate, 120 ml of n-butyl methacrylate, 260 ml of t-butyl acrylate, 60 ml of ethylene glycol dimethacrylate and 6 mg of benzoin. The mixture was subjected to polymerization at room temperature in a nitrogen atmosphere by irradiation with ultraviolet light. The polymer block obtained was shaped into a contact lens form (maximum thickness: 0.4 mm) by an ordinary cutting. Then, this shaped article was dipped in 10% aqueous sodium hydroxide solution, subjected to a treatment at 50° C. for 4 hrs, washed with water and dried to obtain a contact lens. Evaluation results of this contact lens are shown in Table 3.

EXAMPLE 9

A shaped article having a contact lens form (maximum thickness: 0.4 mm) obtained by the same polymerization and cutting as those in Example 8 was dipped in 10% aqueous sodium hydroxide solution, subjected to a treatment at 50° C. for 4 hrs and thoroughly washed with water. Then, the article was dipped in 3.6% aqueous hydrochloric acid solution for 1 hr at room temperature, washed with water and dried to obtain a contact lens. Evaluation results of this contact lens are shown in Table 3.

EXAMPLE 10

A shaped article having a contact lens form (maximum thickness: 0.4 mm) obtained by the same polymerization and cutting as those in Example 8 was dipped in 10% aqueous sulfuric acid solution, subjected to a treatment at 90° C. for 24 hrs, washed with water and dried to obtain a contact lens. Evaluation results of this contact lens are shown in Table 3.

EXAMPLE 11

A shaped article having a contact lens form (maximum thickness: 0.4 mm) obtained from the same polymerization and cutting as those in Example 8 was subjected to the same alkali treatment as in Example 9, subjected to an acid treatment, thoroughly washed with water and dried. Then, the article obtained was placed in a 500 ml flask together with 200 g of ethylene glycol and 1 g of methanesulfonic acid, subjected to a treatment at 120° C. for 18 hrs, washed with water and dried to obtain a contact lens. Evaluation results of this contact lens are shown in Table 3.

EXAMPLE 12

A shaped article having a contact lens form (maximum thickness: 0.4 mm) obtained from the same polymerization and cutting as those in Example 8 was dipped in 20% aqueous sodium hydroxide solution for 3 hours at 50° C., washed with water and dried. Then, the article was placed in a 500-ml flask together with 200 g of ethylene glycol and 3 g of methanesulfonic acid, subjected to a treatment at 120° C. for 24 hrs, washed with water and dried to obtain a contact lens. Evaluation results of this contact lens are shown in Table 3.

COMPARATIVE EXAMPLE 2

A shaped article having a contact lens form (maximum thickness: 0.4 mm) obtained from the same polymerization and cutting as those in Example 8 was evaluated without being subjected to any treatment. Its evaluation results are shown in Table 3.

TABLE 3

| Evaluation item | Ex. 8 | Ex. 9 | Ex. 10 | Ex. 11 | Ex. 12 | Comp. Ex. 2 |
| --- | --- | --- | --- | --- | --- | --- |
| (a) Removability of stain | Good | Good | Good | Good | Good | Bad |
| (b) Wettablilty | Good | Good | Good | Good | Good | Bad |
| (c) Contact angle of water | 77° | 80° | 82° | 79° | 80° | 95° |
| (d) Visibility range when applied | Good | Good | Good | Good | Good | Bad |

TABLE 3-continued

| Evaluation item | Ex. 8 | Ex. 9 | Ex. 10 | Ex. 11 | Ex. 12 | Comp. Ex. 2 |
|---|---|---|---|---|---|---|
| (e) Movability on eyeball when applied | Good | Good | Good | Good | Good | Bad |
| (f) Durability of improved layer | Good | Good | Good | Good | Good | Bad |
| (g) Light transmittance | Above 90% | Above 90% | Above 90% | Above 90% | Above 90% | Above 90% |
| (h) Abnormality when used for long time | | | | | | |
|     Contact lens | Good | Good | Good | Good | Good | Bad |
|     Cornea | Good | Good | Good | Good | Good | Bad |
| (i) Thickness of improved layer ($\mu$m) | 5 | 5 | 4 | 5 | 5 | 0 |

Note:
Items (a) to (h) were evaluated in the same manners as in Table 1, respectively. Item (i), thickness of improved layer, was measured by cutting a contact lens and examining the thickness of improved layer by means of a polarizing microscope.

EXAMPLE 13

Into a polyethylene mold of a diameter of 15 mm and a height of 20 mm was poured 1.5 ml of a mixture consisting of 260 ml of acrylic acid, 280 ml of n-butyl methacrylate, 30 ml of ethylene glycol dimethacrylate and 6 mg of benzoin. The mixture was subjected to polymerization at room temperature in a nitrogen atmosphere by irradiation with ultraviolet light. The polymer block obtained was shaped into a contact lens form by an oridinary cutting. Then, this shaped article was dipped in n-propyl alcohol, and after addition of 1% of methanesulfonic acid, subjected to a reaction for 24 hrs at a refluxing temperature to esterify 93% of the carboxyl group in the polymer. After the reaction, the article was washed with water and dried to obtain a soft shaped article having a contact lens form (maximum thickness: 0.4 mm). This soft shaped article was treated in the same manner as in Example 8 to obtain a contact lens. Evaluation results of the lens are shown in Table 4.

EXAMPLE 14

A soft shaped article having a contact lens form (maximum thickness: 0.4 mm) obtained by the same procedure as in Example 13 was treated in the same manner as in Example 9 to obtain a contact lens. Its evaluation results are shown in Table 4.

EXAMPLE 15

A soft shaped article having a contact lens form (maximum thickness: 0.4 mm) obtained in the same procedure as in Example 13 was treated in the same manner as in Example 10 to obtain a contact lens. Its evaluation results are shown in Table 4.

EXAMPLE 16

A soft shaped article having a contact lens form (maximum thickness: 0.4 mm) obtained in the same procedure as in Example 13 was treated in the same manner as in Example 11 to obtain a contact lens. Its evaluation results are shown in Table 4.

EXAMPLE 17

A soft shaped article having a contact lens form (maximum thickness: 0.4 mm) obtained in the same procedure as in Example 13 was treated in the same manner as in Example 12 to obtained a contact lens. Its evaluation results are shown in Table 4.

COMPARATIVE EXAMPLE 3

A soft shaped article having a contact lens form (maximum thickness: 0.4 mm) obtained in the same procedure as in Example 13 was evaluated as it was. Its evaluation results are shown in Table 4.

TABLE 4

| Evaluation item | Ex. 13 | Ex. 14 | Ex. 15 | Ex. 16 | Ex. 17 | Comp. Ex. 3 |
|---|---|---|---|---|---|---|
| (a) Removability of stain | Good | Good | Good | Good | Good | Bad |
| (b) Wettability | Good | Good | Good | Good | Good | Bad |
| (c) Contact angle of water | 75° | 80° | 80° | 78° | 79° | 93° |
| (d) Visibility range when applied | Good | Good | Good | Good | Good | Bad |
| (e) Movability on eyeball when applied | Good | Good | Good | Good | Good | Bad |
| (f) Durability of improved layer | Good | Good | Good | Good | Good | Bad |
| (g) Light transmittance | Above 90% | Above 90% | Above 90% | Above 90% | Above 90% | Above 90% |
| (h) Abnormality when used for long time | | | | | | |
|     Contact lens | Good | Good | Good | Good | Good | Bad |
|     Cornea | Good | Good | Good | Good | Good | Bad |
| (i) Thickness of improved layer ($\mu$m) | 7 | 7 | 5 | 7 | 7 | 0 |
| (j) Oxygen permeability | 2.01 | 1.94 | 1.88 | 1.96 | 1.92 | 1.54 |

Note:
Items (a) to (h) was evaluated in the same manners as in Table 1, respectively. Item (i) was evaluated in the same manner as in Table 3. Item (j), oxygen permeability, was obtained by using a sliced disc of a diameter of 13 mm and a thickness of 0.2 mm cut differently from the case of contact lens and treated in the same manner as in the case of contact lens and by measuring with an oxygen permeability measurement tester (manufactured by SCHEMA VERASATAE). The unit of oxygen permeability is $cm^3 \cdot cm/cm^2 \cdot sec \cdot mm\ Hg$.

What is claimed is:

1. A process for producing a shaped article having an improved surface, comprising subjecting a shaped article consisting of a substantially nonhydrous polymer derived from a monomer mixture comprising at least 80 mole % of at least one monomer selected from acrylates and methacrylates, 0.5 to 10 mole % of a polyfunctional monomer, and 0 to 5% by volume of acrylic acid or methacrylic acid to at least one treatment selected from a treatment with an aqueous solution of an inorganic salt, an organic salt or a combinatin of them at a temperature of 90° C. to boiling point at atmospheric pressure or at a temperature of 100° C. to boiling point under pressure, a treatment with an aqueous alkali solution of 5 to 50% by weight at a temperature of 30° C. to 120° C. and a treatment with an aqueous acid solution of 5 to 90% by weight at a temperature of 60° to 100° C., the said treatment with an aqueous alkali solution or an aqueous acid solution improving the 0.01–50-μm thick surface portion of the shaped article.

2. A process according to claim 1, wherein said acrylates and methacrylates are selected from the group consisting of methyl acrylate, ethyl, acrylate, n-propyl acrylate, 1-propyl acrylate, n-butyl acrylate, i-butyl acrylate, t-butyl acrylate, 2-ethylhexyl acrylate, n-octyl acrylate, ethyl methacrylate, n-propyl methacrylate, i-propyl methacrylate, n-butyl methacrylate, i-butyl methacrylate, t-butyl methacrylate, 2-ethylhexyl methacrylate, n-hexyl methacrylate and n-octyl methacrylate.

3. A process according to claim 1, wherein the polyfunctional monomer is selected from the group consisting of polyfunctional acrylates, polyfunctional methacrylates, olefin glycol diacrylates, polyolefin glycol diacrylates, olefin glycol diacrylates, polyolefin glycol diacrylates, olefin glycol dimethacrylates and polyolefin glycol dimethacrylates.

4. A process according to claim 1, wherein the inorganic salt is selected from the group consisting of sulfites, sulfates, nitrites, nitrates, phosphates and halides of metals of Groups Ia, Ib, IIa, IIb, IIIa, IVa, VIb, VIIb and VIII of the Periodic Table.

5. A process according to claim 1, wherein the organic salt is selected from the group consisting of formates, acetates and citrates of metals of Groups Ia and IIa of the Periodic Table.

6. A process according to claim 1, wherein the concentration of the inorganic salt or the organic salt is 2% by weight to saturated concentration.

7. A process according to claim 1, wherein the shaped article is subjected to an aqueous alkali solution treatment or an aqueous acid solution treatment or both.

8. A process according to claim 7, wherein after the aqueous alkali solution treatment, the aqueous acid solution treatment is conducted.

9. A process according to claim 7, wherein the shaped article which has been washed with water and dried is further treated with a polyhydric alcohol in the presence of an acid catalyst.

10. A process for producing a shaped article having an improved surface comprising subjecting a shaped article consisting of a substantially nonhydrous polymer derived from a monomer mixture comprising at least 80 mole % of at least one monomer selected from acrylates and methacrylates to a hot water treatment wherein the hot water is steam.

11. A process according to claim 1, wherein the shaped article is a contact lens.

12. A process according to claim 10, wherein the shaped article is a contact lens.

13. A process according to claim 1, wherein the inorganic salt is selected from the group consisting of sulfites, sulfates, nitrites, nitrates, phosphates and halides of metals of Groups Ia and Ib of the Periodic Table.

14. A process according to claim 1, wherein the organic salt is selected from the group consisting of formates, acetates and citrates of metals of Group Ia of the Periodic Table.

* * * * *